(12) United States Patent
Brashler et al.

(10) Patent No.: US 11,795,960 B2
(45) Date of Patent: *Oct. 24, 2023

(54) MOLTEN SULFUR PUMP VIBRATION AND TEMPERATURE SENSOR FOR ENHANCED CONDITION MONITORING

(71) Applicant: Saudi Arabian Oil Company, Dhahran (SA)

(72) Inventors: Keith William Brashler, Dhahran (SA); Doru Catalin Turcan, Dhahran (SA); Ali Al Shehri, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 114 days.

This patent is subject to a terminal disclaimer.

(21) Appl. No.: 17/333,572

(22) Filed: May 28, 2021

(65) Prior Publication Data
US 2022/0381254 A1    Dec. 1, 2022

(51) Int. Cl.
*F04D 27/00*      (2006.01)
*F04D 29/40*      (2006.01)
(Continued)

(52) U.S. Cl.
CPC ............ *F04D 27/001* (2013.01); *F04D 7/00* (2013.01); *F04D 29/043* (2013.01);
(Continued)

(58) Field of Classification Search
CPC . F04D 27/001; F04D 7/00; F04D 7/02; F04D 7/06; E21B 43/128
See application file for complete search history.

(56) References Cited

U.S. PATENT DOCUMENTS 2,086,806 A    7/1937   Aladar
6,567,709 B1   5/2003   Malm et al.
(Continued)

OTHER PUBLICATIONS

Emerson Reliability Solutions, "A0710GP Industrial Accelerometer," Specifications Sheet, Jun. 2017, 2 pages.
(Continued)

*Primary Examiner* — David E Sosnowski
*Assistant Examiner* — Jackson N Gillenwaters
(74) *Attorney, Agent, or Firm* — Fish & Richardson P.C.

(57) ABSTRACT

A system includes a vertical molten sulfur pump assembly that includes a top portion adjacent to a first end of the vertical molten sulfur pump assembly and a bottom portion adjacent to a second end of the vertical molten sulfur pump assembly. A pump motor is disposed in the top portion, an impeller is disposed in the bottom portion within an impeller casing, and a shaft is disposed within a central column and connecting the pump motor with the impeller. A pump inlet is disposed at the second end below the impeller casing. The pump inlet and the impeller casing are configured to be immersed in molten sulfur. The vertical molten sulfur pump assembly is configured to pump the molten sulfur into the inlet and upwards through a discharge passageway by rotation of the impeller. A vibration sensor and a temperature sensor are disposed on an external surface of the bottom portion, on or proximate to the impeller casing and the pump inlet. The temperature sensor is configured to measure a temperature of the molten sulfur proximate to the pump inlet. The vibration sensor includes a substrate comprising a polymer and a resonant layer disposed on a surface of the substrate. The resonant layer includes an electrically conductive nanomaterial and is configured to produce a resonant response in response to receiving a radio frequency signal.

6 Claims, 6 Drawing Sheets

(51) Int. Cl.
*F04D 7/00* (2006.01)
*F04D 29/043* (2006.01)
*G01H 17/00* (2006.01)
*G01J 5/00* (2022.01)
*H04Q 9/00* (2006.01)

(52) U.S. Cl.
CPC .......... *F04D 29/406* (2013.01); *G01H 17/00* (2013.01); *G01J 5/00* (2013.01); *H04Q 9/00* (2013.01); *G01J 2005/0077* (2013.01); *H04Q 2209/40* (2013.01)

(56) References Cited

U.S. PATENT DOCUMENTS

| | | | |
|---|---|---|---|
| 8,401,806 B2 | 3/2013 | Borsting et al. | |
| 9,863,476 B2 | 1/2018 | Gray | |
| 11,378,491 B2 * | 7/2022 | Decook | G01P 3/487 |
| 2002/0045921 A1 | 4/2002 | Wolinsky | |
| 2002/0177782 A1 | 11/2002 | Penner | |
| 2006/0266913 A1 | 11/2006 | McCoy et al. | |
| 2008/0015421 A1 | 1/2008 | Penner | |
| 2008/0293446 A1 | 11/2008 | Rofougaran | |
| 2012/0181965 A1 * | 7/2012 | Chamberlin | D06F 34/16 310/68 B |
| 2013/0342362 A1 | 12/2013 | Martin | |
| 2014/0260523 A1 | 9/2014 | Peczalski | |
| 2016/0290126 A1 | 10/2016 | Rendusara | |
| 2017/0167245 A1 | 6/2017 | Dickenson | |
| 2018/0051700 A1 * | 2/2018 | Sheth | F04D 29/22 |
| 2018/0180056 A1 * | 6/2018 | Zolotukhin | F04D 29/043 |
| 2019/0156600 A1 * | 5/2019 | Potyrailo | G07C 5/0816 |
| 2019/0317488 A1 | 10/2019 | Al-Maghlouth et al. | |
| 2019/0326906 A1 * | 10/2019 | Camacho Cardenas | H03K 17/945 |
| 2020/0089217 A1 | 3/2020 | Cella et al. | |
| 2020/0224745 A1 | 7/2020 | Landig | |
| 2021/0027606 A1 | 1/2021 | Al-Meqbel et al. | |
| 2021/0229503 A1 * | 7/2021 | Stowell | B60C 23/064 |
| 2021/0348909 A1 | 11/2021 | Stowell | |
| 2022/0381134 A1 | 12/2022 | Al Shehri et al. | |
| 2022/0381704 A1 | 12/2022 | Al Shehri et al. | |

OTHER PUBLICATIONS

Abdulelah et al., "Pipe Strain Effects on Pumps—Case Study" SPE-203428-MS, Society of Petroleum Engineers, paper presented at the Abu Dhabi International Petroleum Exhibition & Conference, Abu Dhabi, UAE, Nov. 2020, 13 pages.

* cited by examiner

MOLTEN SULFUR PUMP VIBRATION AND TEMPERATURE SENSOR FOR ENHANCED CONDITION MONITORING

TECHNICAL FIELD

This disclosure relates to condition monitoring of molten sulfur pumps.

BACKGROUND

For molten sulfur sumps, tanks or pits installed below ground level, it is common practice to use a vertical pump. Due to the nature of operation of molten sulfur pumps, they are known to fail for a variety of reasons in various locations along the pump. Equipment maintenance and replacement can incur high operating and capital costs. Extending the operating life of critical equipment and ensuring their reliability in operations can be useful and important to inspection and maintenance engineers. Information from sensing and monitoring instrumentation and diagnostic testing are often relied upon to ascertain the status and operating conditions of such assets.

SUMMARY

This disclosure describes technologies relating to condition monitoring of vertical molten sulfur pumps.

Certain aspects of the subject matter herein can be implemented as a system including a vertical molten sulfur pump assembly. The vertical molten sulfur pump assembly includes a top portion adjacent to a first end of the vertical molten sulfur pump assembly and a bottom portion adjacent to a second end of the vertical molten sulfur pump assembly. A pump motor is disposed in the top portion, an impeller is disposed in the bottom portion within an impeller casing, and a shaft is disposed within a central column and connecting the pump motor with the impeller. A pump inlet is disposed at the second end below the impeller casing. The pump inlet and the impeller casing are configured to be immersed in molten sulfur. The vertical molten sulfur pump assembly is configured to pump the molten sulfur into the inlet and upwards through a discharge passageway by rotation of the impeller. A vibration sensor and a temperature sensor are disposed on an external surface of the bottom portion, on or proximate to the impeller casing and the pump inlet. The temperature sensor is configured to measure a temperature of the molten sulfur proximate to the pump inlet. The vibration sensor includes a substrate comprising a polymer and a resonant layer disposed on a surface of the substrate. The resonant layer includes an electrically conductive nanomaterial and is configured to produce a resonant response in response to receiving a radio frequency signal.

An aspect combinable with any of the other aspects can include the following features. The system further includes a computer system. The computer system includes one or more processors and a non-transitory computer readable medium storing instructions executable by the one or more processors to perform computer system operations. The operations include receiving the resonating response and processing the resonating response to determine a current vibrational strain of the resonant layer.

An aspect combinable with any of the other aspects can include the following features. The operations further include determining a pump failure condition of one of a plurality of components of the vertical molten sulfur pump assembly by comparing the determined operational strain with a plurality of vibrational strain signatures to determine whether the determined vibrational strain matches any of the plurality of vibrational strain signatures, wherein at least one of the plurality of vibrational strain signatures corresponds to the component failure condition.

An aspect combinable with any of the other aspects can include the following features. Determining the pump failure condition further includes using temperature data from the temperature sensor.

An aspect combinable with any of the other aspects can include the following features. The failure condition corresponds to a failure of a bushing in the bottom portion at a bottom end of the shaft.

An aspect combinable with any of the other aspects can include the following features. The system further includes a sensor capsule comprising a cover attached to a portion of the external surface of the bottom portion, thereby defining a capsule interior volume isolated from the molten sulfur, and wherein the vibration sensor is positioned within the capsule interior volume.

An aspect combinable with any of the other aspects can include the following features. The sensor capsule includes a polymer material.

Certain aspects of the subject matter herein can be implemented as a system including a vertical molten sulfur pump assembly. The vertical molten sulfur pump assembly includes a top portion adjacent to a first end of the vertical molten sulfur pump assembly and a bottom portion adjacent to a second end of the vertical molten sulfur pump assembly. The system further includes a pump motor disposed in the top portion, an impeller disposed in the bottom portion within an impeller casing, and a shaft disposed within a central column and connecting the pump motor with the impeller. A pump inlet is disposed at the second end below the impeller casing. The pump inlet and the impeller casing are configured to be immersed in molten sulfur, and wherein the vertical molten sulfur pump assembly is configured to pump the molten sulfur into the pump inlet and upwards through a discharge passageway by rotation of the impeller. The system further includes an infrared temperature measurement camera disposed exterior to the vertical molten sulfur pump assembly and configured to measure a temperature of the molten sulfur proximate to the pump inlet, and a vibration sensor disposed on an external surface of the bottom portion, on or proximate to the impeller casing and the pump inlet. The vibration sensor includes a substrate comprising a polymer and a resonant layer disposed on a surface of the substrate, the resonant layer comprising an electrically conductive nanomaterial and configured to produce a resonant response in response to receiving a radio frequency signal.

Certain aspects of the subject matter herein can be implemented as a method. The method includes introducing a vertical molten sulfur pump assembly including a top portion adjacent to a first end of the vertical molten sulfur pump assembly and a bottom portion adjacent to a second end of the vertical molten sulfur pump assembly. The vertical molten sulfur pump assembly further includes a pump motor disposed in the top portion, an impeller disposed in the bottom portion within an impeller casing, and a shaft disposed within a central column and connecting the pump motor with the impeller. A pump inlet is disposed at the second end below the impeller casing. The method further includes attaching a vibration sensor on an external surface of the bottom portion of the vertical molten sulfur pump assembly, on or proximate to the impeller casing and the pump inlet. The vibration sensor includes a substrate including a polymer and a resonant layer disposed on a surface of the substrate and including an electrically conductive nanomaterial. The method further includes attaching a temperature sensor on the external surface of the bottom portion of the vertical molten sulfur pump assembly, on or proximate to the bowl casing and the pump inlet, immersing the pump inlet and the impeller casing in molten sulfur, and pumping the molten sulfur into the inlet and upwards through a discharge passageway by rotation of the impeller. The method further includes transmitting, by a radio frequency interrogator and while pumping the molten sulfur, a radio frequency signal, and receiving, by a radio frequency resonance detector, a resonant response in response to the radio frequency signal, the resonant response produced by the resonant layer of the vibration sensor.

An aspect combinable with any of the other aspects can include the following features. The radio frequency interrogator and the radio frequency resonance detector are communicatively coupled to a computer system. The computer system includes one or more processors and a non-transitory computer readable medium storing instructions executable by the one or more processors to perform computer system operations. The method further includes receiving, by the computer system, a current temperature of the molten sulfur proximate to the pump inlet, receiving, by the computer system, the resonating response, and processing, by the computer system, the resonating response to determine a current vibrational strain of the resonant patch.

An aspect combinable with any of the other aspects can include the following features. The method further includes determining, by the computer system, a pump failure condition of one of a plurality of components of the vertical molten sulfur pump assembly by comparing the determined operational strain with a plurality of vibrational strain signatures to determine whether the determined vibrational strain matches any of the plurality of vibrational strain signatures, wherein at least one of the plurality of vibrational strain signatures corresponds to the component failure condition.

An aspect combinable with any of the other aspects can include the following features. Determining the pump failure condition further includes using temperature data from the temperature sensor.

An aspect combinable with any of the other aspects can include the following features. The failure condition corresponds to a failure of a bushing in the bottom portion at a bottom end of the shaft.

An aspect combinable with any of the other aspects can include the following features. The vibration sensor is positioned within a capsule interior volume of a sensor capsule comprising a cover attached to a portion of the external surface of the bottom portion, the capsule interior volume isolated from the molten sulfur.

An aspect combinable with any of the other aspects can include the following features. The sensor capsule includes a polymer material.

Certain aspects of the subject matter herein can be implemented as a method. The method includes introducing a vertical molten sulfur pump assembly including a top portion adjacent to a first end of the vertical molten sulfur pump assembly and a bottom portion adjacent to a second end of the vertical molten sulfur pump assembly. The vertical molten sulfur pump assembly includes a pump motor disposed in the top portion, an impeller disposed in the bottom portion within an impeller casing, and a shaft disposed within a central column and connecting the pump motor with the impeller. A pump inlet is disposed at the second end below the impeller casing. The method further includes attaching a vibration sensor on an external surface of the bottom portion of the vertical molten sulfur pump assembly, on or proximate to the impeller casing and the pump inlet. The vibration sensor includes a substrate comprising a polymer, a resonant layer disposed on a surface of the substrate and including an electrically conductive nanomaterial. The method further includes immersing the pump inlet and the impeller casing in molten sulfur, pumping the molten sulfur into the inlet and upwards through a discharge passageway by rotation of the impeller, measuring, by an infrared temperature measurement camera disposed exterior to the vertical molten sulfur pump assembly, a current temperature of the molten sulfur proximate to the pump inlet. The method further includes transmitting, by a radio frequency interrogator and while pumping the molten sulfur, a radio frequency signal and receiving, by a radio frequency resonance detector, a resonant response in response to the radio frequency signal, the resonant response produced by the resonant layer of the vibration sensor.

An aspect combinable with any of the other aspects can include the following features. The radio frequency interrogator and the radio frequency resonance detector are communicatively coupled to a computer system. The computer system includes one or more processors and a non-transitory computer readable medium storing instructions executable by the one or more processors to perform computer system operations. The method further includes receiving, by the computer system, a current temperature of the molten sulfur proximate to the pump inlet, receiving, by the computer system, the resonating response, and processing, by the computer system, the resonating response to determine a current vibrational strain of the resonant layer.

An aspect combinable with any of the other aspects can include the following features. The method further includes determining, by the computer system, a pump failure condition of one of a plurality of components of the vertical molten sulfur pump assembly by comparing the determined operational strain with a plurality of vibrational strain signatures to determine whether the determined vibrational strain matches any of the plurality of vibrational strain signatures, wherein at least one of the plurality of vibrational strain signatures corresponds to the component failure condition.

An aspect combinable with any of the other aspects can include the following features. Determining the pump failure condition further includes using temperature data from infrared temperature measurement camera.

An aspect combinable with any of the other aspects can include the following features. The vibration sensor is positioned within a capsule interior volume of a sensor capsule comprising a cover attached to a portion of the external surface of the bottom portion, the capsule interior volume isolated from the molten sulfur.

The details of one or more implementations of the subject matter of this disclosure are set forth in the accompanying drawings and the description. Other features, aspects, and advantages of the subject matter will become apparent from the description, the drawings, and the claim

DETAILED DESCRIPTION

Figure 1A:
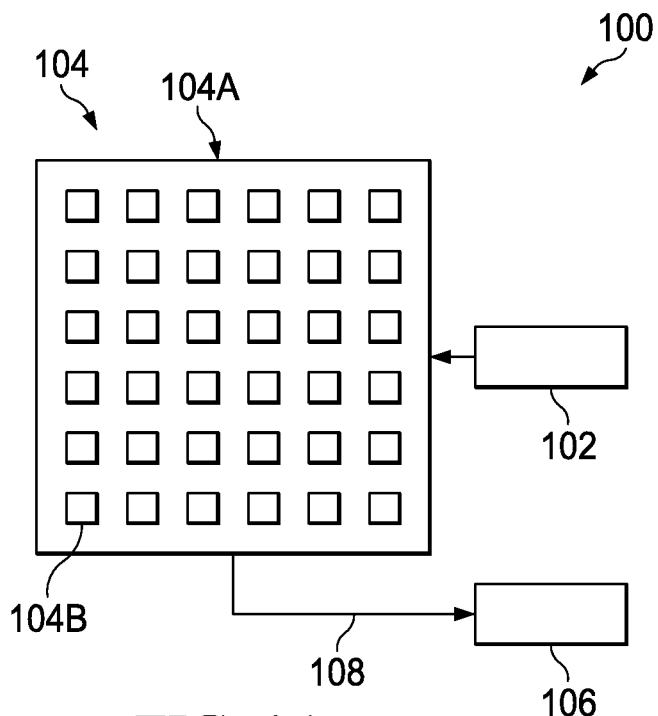
FIG. 1A is a schematic diagram of an example vibration sensor.

This disclosure describes condition monitoring of pumps, and more specifically, vibration and temperature sensing during operation of vertically suspended molten sulfur pumps.

Vertical molten sulfur pumps are typically mounted on a baseplate or separation plate that is grouted to a concrete foundation. These pumps are vertically suspended into a sulfur sump containing the molten sulfur. The temperature of the molten sulfur seen by the pumps can range from about 285° F. to about 310° F. The molten sulfur is typically temperature regulated with imbedded steam coils in the sump to maintain tight temperature control of the sulfur between about 285° F. to about 310° F., in order to ensure that the sulfur is of a suitable viscosity such that it can be pumped (i.e. does not solidify or become too viscous).

In an embodiment of the present disclosure, a vibration sensor and a temperature sensor are disposed on a bottom portion of a molten sulfur pump. The vibration sensor includes a responsive layer that produces a resonating response in response to a radio frequency (RF) signal. An RF resonance detector detects the resonating response of the responsive layer to determine vibrational strain.

The subject matter described in this disclosure can be implemented in particular implementations, so as to realize one or more of the following advantages. The vibration and temperature sensors can be implemented on vertical molten sulfur pumps for conditioning monitoring, which can be used to flag operational issues (such as pump failure modes) as they arise. Early detection of failure modes can significantly reduce maintenance costs, increase availability of equipment, and allow for proper scheduling and maintenance planning efforts. Vibrations of various components of an operating pump can be identified and monitored, allowing for condition monitoring of the various components, including, for example, the impeller and bottom bearing/bushing. In some embodiments, the vibration sensor includes nanoscale materials that interact with RF techniques, which can enhance sensitivity of vibration sensing and can also allow for low-temperature sintering fabrication on stretchable polymer substrates. Vibrational anomalies from multiple, different regions of a pump can be detected and amplified for enhanced sensing using a single vibration sensor (located, for example, near the first-stage impeller proximate to the inlet) due to the sensitivity of vibration sensing of the nanoscale materials. By including not only vibrational data but also temperature data, operational failures can be more effectively identified and avoided and operations can be optimized.

In accordance with some embodiments of the present disclosure, machine learning can be used to determine failure conditions of individual components of a vertical molten sulfur pump, based on comparing measured vibrational data with signatures correlating to specific component faults. In some embodiments, by placing the vibration and temperature sensors below-grade on the bottom portion of a vertical molten sulfur pump assembly (for example, on an external surface of an impeller casing which houses the first-stage impeller), failure conditions of or near key components, such as the inlet, shaft, impeller, and line-shaft bushings, can be more readily and accurately detected. Furthermore, in some embodiments, by encapsulating the sensors, the sensors are protected from fluids and the potential for sparks or other safety concerns is reduced.

Referring to FIG. 1A, vibration sensor 100 includes an RF interrogator 102, a responsive patch 104, an RF resonance detector 106, and a transmission line 108. The responsive patch 104 includes a substrate 104a and a resonant layer 104b. The resonant layer 104b is disposed on a surface of the substrate 104a. The transmission line 108 couples the responsive patch 104 to the RF resonance detector 106.

The RF interrogator 102 is configured to produce an electromagnetic interrogation pulse having a first frequency. The first frequency can be in a range of from about 300 megahertz (MHZ) to about 1,000 gigaherz (gHz), from about 300 MHz to about 500 GHz, from about 300 MHz to about 300 GHz, from about 300 MHz to about 100 GHz, or from about 1 GHz to about 60 GHz.

The responsive patch 104 includes a nanoscale polymer composite material. For example, the responsive patch 104 includes a composite material that includes a polymer and a nanomaterial. In some implementations, the substrate 104a includes a solid metal. For example, the substrate 104a is made of solid copper. In some implementations, the substrate 104a includes a stretchable polymer. For example, the substrate 104a includes a silicone, such as polydimethylsiloxane (PDMS). The resonant layer 104b includes an electrically conductive nanomaterial and is configured to resonate at the first frequency in response to receiving the electromagnetic interrogation pulse from the RF interrogator 102. For example, the shape and/or dimensions of the resonant layer 104b including the electrically conductive nanomaterial can be adjusted, such that the resonant layer 104b resonates at the first frequency. In some implementations, a thickness of the resonant layer 104b varies along a first dimension, a length of the resonant layer 104b varies along a second dimension, a width of the resonant layer 104b varies along a third dimension, or any combination of these. In some implementations, the electrically conductive nanomaterial includes carbon nanotubes (CNT), silver nanoparticles, or a combination of these. The CNT, silver nanoparticles, or both can be disposed on the substrate 104a (for example, the stretchable polymer substrate). In some implementations, the electrically conductive nanomaterial is disposed in an electrically insulating matrix (for example, made of poly(methyl methacrylate) (PMMA)), which is disposed on the substrate 104a made of a stretchable polymer (for example, PDMS).

Figure 2A:
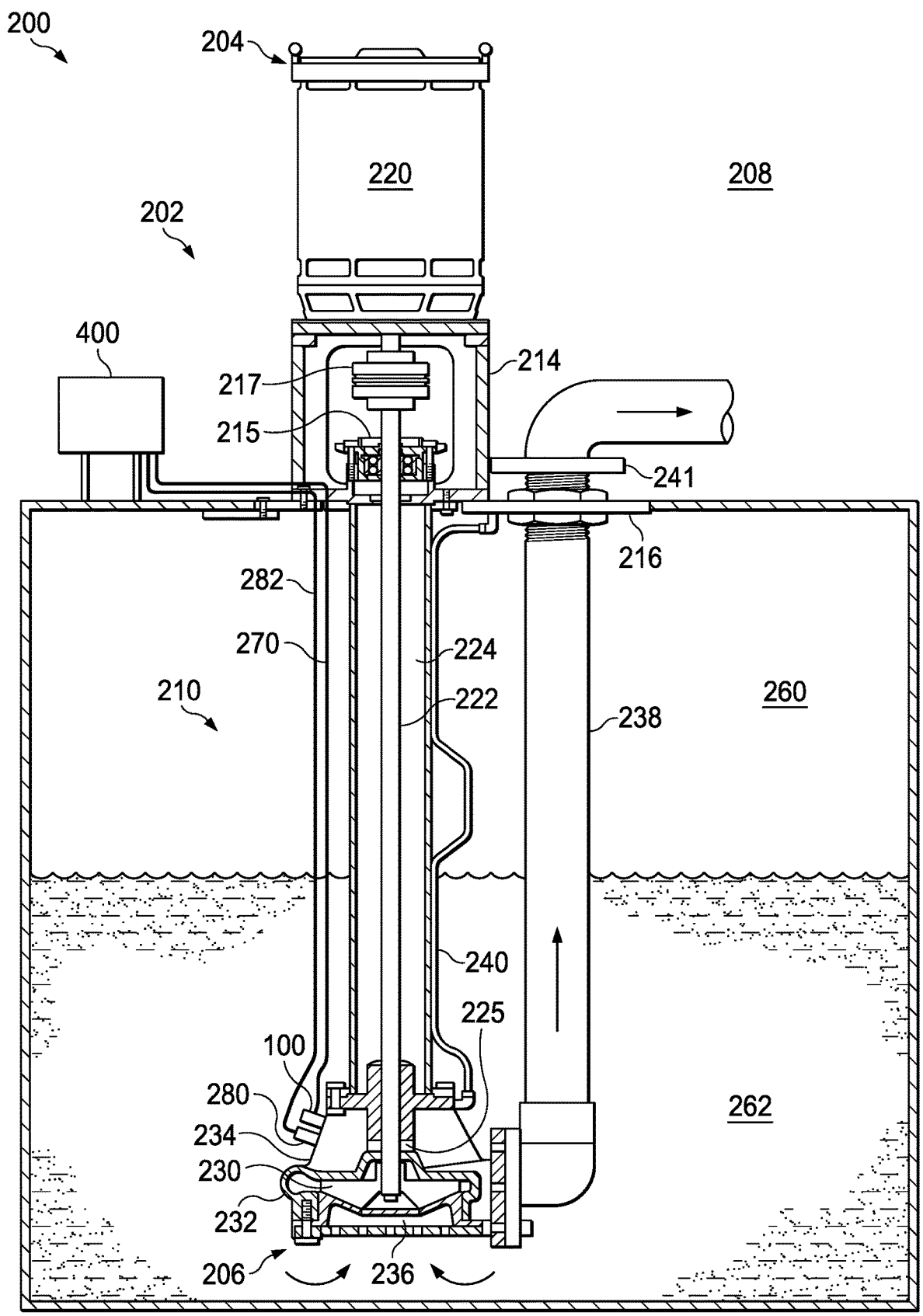
FIG. 2A is a schematic drawing of an example vertical molten sulfur pump vibration and temperature monitoring system.
Figure 2B:
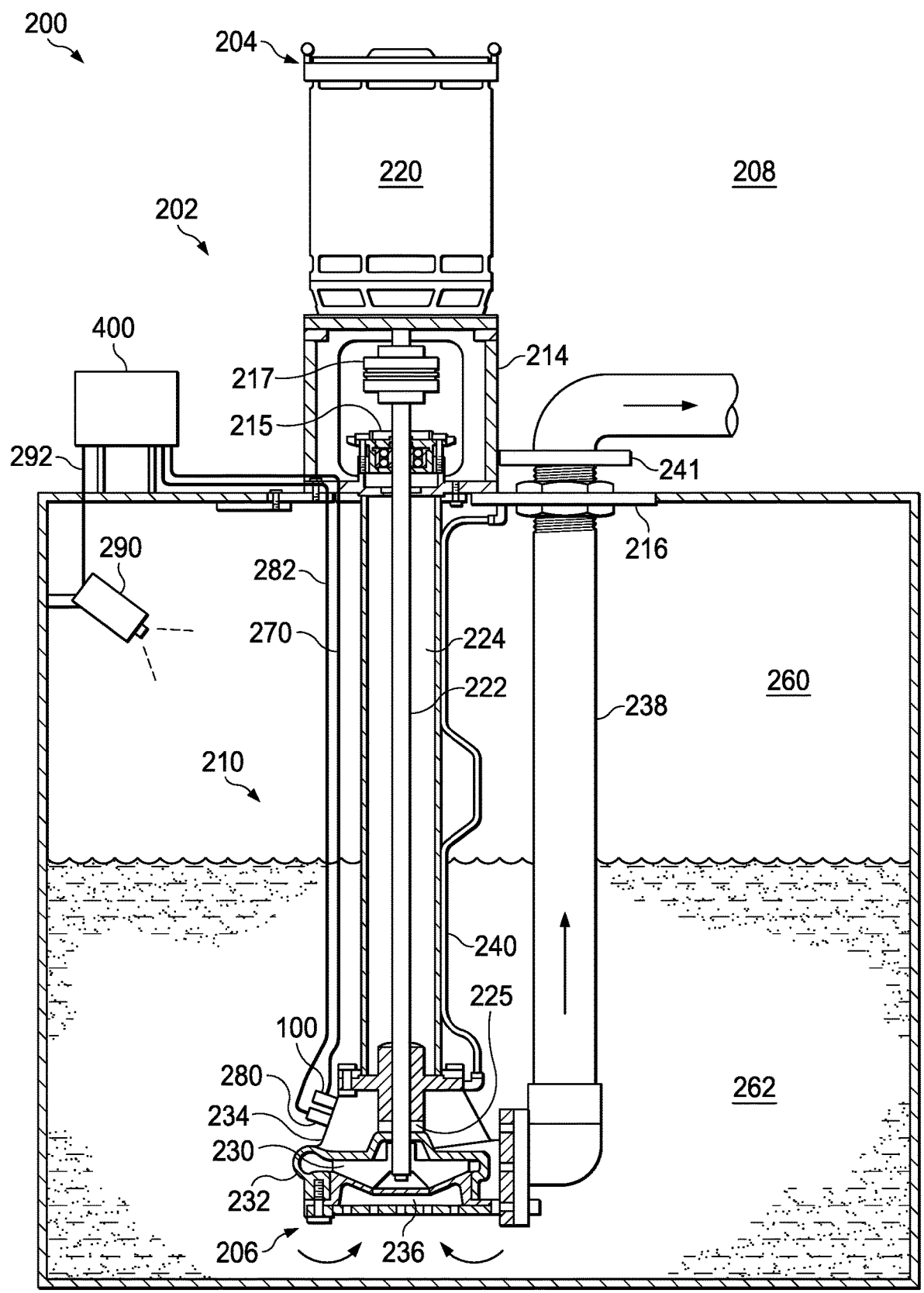
FIG. 2B is a schematic drawing of an alternative example vertical molten sulfur pump vibration and temperature monitoring system.

In some implementations, as shown in FIGS. 1A and 2B, the resonant layer 104b is disposed on the substrate 104a in the form of an array of discrete portions of the electrically conductive nanomaterial disposed on a surface of the substrate 104a. In some implementations, the resonant layer 104b is configured to resonate at various frequencies, for example, such that the vibration sensor 100 can sense vibrations of different components of an operating pump. In some implementations, the resonant layer 104b is disposed on the substrate 104a by a photolithography technique, ion etching, sputter deposition, inkjet printing, or screen printing.

The transmission line 108 is configured to transmit a resonating response of the responsive patch 104 to the RF resonance detector 106. The RF resonance detector 106 is configured to detect the resonating response of the responsive patch 104 transmitted by the transmission line 108. In some implementations, the RF interrogator 102 and the RF resonance detector 106 are parts of an RF network analyzer, which can be a scalar or vector type analyzer. In such implementations, the RF network analyzer both produces the electromagnetic interrogation pulse and detects the resonating response of the responsive patch 104. The RF network analyzer can excite, via the RF interrogator 102, the responsive patch 104 with the electromagnetic interrogation pulse (RF signal) propagating at a frequency of interest (for example, 2.4 GHz), and then the resonating response of the responsive patch 104 is detected by the RF network analyzer via the RF resonance detector 106. The resonating response of the responsive patch 104 will exhibit a phase, amplitude, and resonance shift in comparison to the original interrogation pulse based on the composition and dimensions of the responsive patch 104. The RF resonance detector 106 can detect the phase, amplitude, and resonance shifts and can measure scattering parameters (S-parameters) of the resonating response of the responsive patch 104, such as return loss. The measured return loss can be correlated to vibration behavior. In some implementations, the RF interrogator 102 and the RF resonance detector 106 are connected to the responsive patch 104 by SubMiniature version A (SMA) connectors.

Figure 1B:
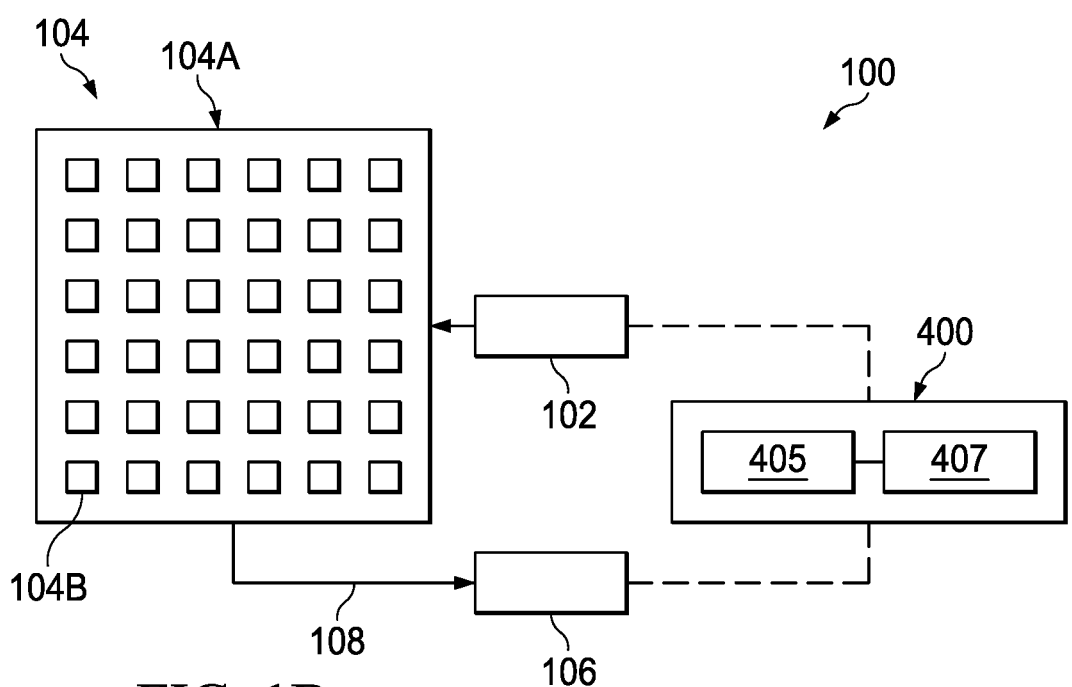
FIG. 1B is a schematic diagram of the vibration sensor of FIG. 1A including a computer system.
Figure 4:
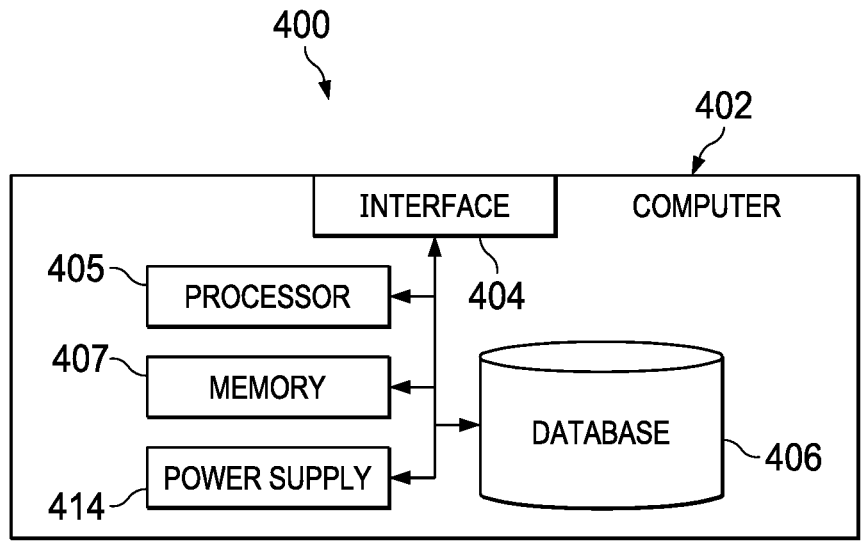
FIG. 4 is a block diagram of an example computer system that can be included in the vibration sensor of FIG. 1A.

In some implementations, as shown in FIG. 1B, the vibration sensor 100 includes a computer system 400. The computer system 400 can be communicatively coupled to the RF resonance detector 106. The computer system 400 includes a processor 405 and a memory 407. The memory is coupled to the processor 405 and stores programming instructions for execution by the processor 405. The programming instructions instruct the processor 405 to perform various operations. An example of the computer system 400 is also shown in FIG. 4 and described in more detail later. The operations can include receiving the resonating response from the RF resonance detector 106. The operations can include processing the resonating response to determine a vibrational strain (that is, strain caused by vibration) of the resonant patch 104. The operations can include comparing the determined vibrational strain with various vibrational strain signatures to determine whether the determined vibrational strain matches any of the vibrational strain signatures. The resonating response can be analyzed by the processor 405 by correlating a mechanical change to an electrical length change of the resonant layer 104b and then correlating the electrical length change to a resonance shift signature (vibrational strain signature). Electrical length is related to the resonance frequency of the resonant layer 104b. For example, a resonant layer 104b with a physical length of five centimeters can resonate at a frequency of 2.4 GHz.

Some examples of vibrational strain signatures that can be stored in the memory 407 and be compared with the determined vibrational strain include a vibrational strain signature attributed to pump cavitation, a vibrational strain signature attributed to pump rotor imbalance, a vibrational strain signature attributed to mechanical wear of bushing(s) (such as line shaft bushings), a vibrational strain signature attributed to mechanical wear of bearing(s) (such as bottom bearings), a vibrational strain signature attributed to rubbing between adjacent pump components, and a vibrational strain signature attributed to vertical pump column/mechanical resonance. The operations can include transmitting a warning message (for example, to an operator control screen) in response to determining that the determined vibrational strain of the resonant patch 104 matches any of the vibrational strain signatures. An operator can then mitigate or eliminate the cause of the vibrational strain, which can, for example, extend the life of operating equipment and/or prevent the need for unplanned maintenance activities which can be costly and time-intensive.

A resonant structure can be described as an equivalent circuit of lumped inductors (L) and capacitors (C). In the case of a conductor, if there is a material within the conductor that causes additional capacitance, its presence will effectively increase an electrical length of the conductor, and the resonance of the conductor will decrease. In relation to the vibration sensor 100, vibrational strain conditions can impose additional capacitance and/or affect molecular interactions in the responsive patch 104, which can slow down the RF waveform and effectively increase the electrical length of the resonating structure (responsive patch 104). For example, a resonant structure with an electrical length of $\lambda/2$ will exhibit resonance at a frequency which makes the electrical length of the line half of its wavelength. As velocity of propagation along the line decreases (meaning the wavelength along the line decreases at a given frequency), then the resonant frequency decreases. The proportional decrease in resonant frequency will be equal to the proportional decrease in velocity of propagation.

In some implementations, the computer system 400 is communicatively coupled to the RF interrogator 102. For example, the computer system 400 can be connected to the RF interrogator 102 by a wired connection or a wireless connection. In such implementations, the operations performed by the processor 405 can include causing the RF interrogator 102 to produce the electromagnetic interrogation pulse having the first frequency.

FIGS. 2A and 2B are schematic drawings of a vertical molten sulfur pump vibration and temperature monitoring system in accordance with embodiments of the present disclosure, including the vibration sensor 100 and computer system 400 of FIG. 1B. Referring to FIGS. 2A and 2B, vertical molten sulfur pump vibration and temperature monitoring system 200 includes a vertical molten sulfur pump assembly 202 that is configured to pump molten sulfur 262 within a sulfur sump 260. In some embodiments, molten sulfur 262 is within a sulfur tank or other container instead of a sump.

Molten sulfur pump assembly 202 includes a top or first end 204 and a bottom or second end 206 within a housing 214. A top portion 208 of pump assembly 202 is adjacent to first end 204 and a bottom portion 210 of pump assembly 202 is adjacent to the second end 206. A separator plate 216 separates top portion 208 from bottom portion 210. Top portion 208 includes a motor 220. Motor 220 can be an electric motor or another suitable motor. Motor 220 is connected to a top end of shaft 222. Shaft 222 is disposed within a column 224. Second end 206 includes pump inlet 236.

Within bottom portion 210, the bottom end of shaft 222 is connected to impeller 230 disposed within impeller casing 232. In the illustrated embodiment, the bottom portion 210 includes one impeller. In some embodiments, the pump assembly includes a different number of impellers and corresponding impeller casings, such as, for example, in some embodiments, two or a greater number of impellers and corresponding impeller casings. In such embodiments, the lower impeller and corresponding impeller casing may be referred to as the first stage impeller and first stage impeller casing, respectively. The interior of impeller casing 232 is fluidically connected to discharge passageway 238. Molten pump assembly 202 can include a steam jacket to maintain sulfur temperature and viscosity; steam line 240 provides steam for the steam jacketing. Top bushing 215 and bottom bushing 225 provide alignment and bearing surfaces for shaft 222. In some embodiments, additional or intermediate bushings (such as line-shaft bushings) can be included. Coupling 217 connects the shaft of motor 220 with pump shaft 222.

In the illustrated embodiment, bottom portion 210 is disposed within sulfur sump 260 at least a portion of bottom portion 210 is immersed within molten sulfur 262. In operation, motor 220 rotates shaft 222 which in turn rotates impeller 230, thereby pumping molten sulfur into pump inlet 236 and upwards through discharge passageway 238 and out of discharge nozzle 241. In some embodiments, vertical molten sulfur pump assembly 202 further includes insulating and/or heating jackets (not shown) which disposed around or proximate to column 224, discharge passageway 238, and/or other components of assembly 202 to retain and/or increase heat and thereby maintain the optimum the viscosity of the pumped molten sulfur.

Vertical molten sulfur pump vibration and temperature monitoring system 200 further includes vibration sensor 100 (as described in reference to FIG. 1A) disposed on an external surface 234 of bottom portion 210, on or proximate to impeller casing 232 and the pump inlet 236. In the illustrated embodiment, external surface 234 is an external surface of impeller casing 232. In some embodiments, the external surface on which vibration sensor 100 is disposed can be a different surface of bottom portion 210. In some embodiments, other sensors can be attached on external surface 234 instead of or in addition to vibration sensor 100. Such other or additional sensors can include (but are not limited to) accelerometers (such as the A0710GP accelerometer available from Emerson), RF waveguide/antenna impedance sensors, an optical fiber sensors, and/or a MEMS piezoresistive sensors. In some embodiments, additional vibration sensors can be attached to, for example, the housing of motor 220 or other suitable above-grade or below-grade locations.

Vertical molten sulfur pump vibration monitoring system 200 further includes computer system 400, as described in more detail in reference to FIG. 1B and FIG. 4. Cable 270 or another suitable wired or wireless connection connects vibration sensor 100 with computer system 400. Cable 270 can comprise a coaxial cable, optical fiber cable, hollow waveguide, or other suitable cable.

The embodiment shown in FIG. 2A includes a temperature sensor 280 disposed on an external surface 234 of bottom portion 210, on or proximate to impeller casing 232 and the pump inlet 236. Temperature sensor 280 can be, for example, a thermocouple or a resistance temperature detector (RTD) such as and Omega model SRTD-1/2 Surface Mount RTD temperature sensor or a ProSense model THMJ-B02L06 Thermocouple Bolt-on Ring Sensor. Temperature sensor 280 can measure the temperature of the molten sulfur 262 proximate to pump inlet 236. Cable 282 or another suitable wired or wireless connection connects temperature sensor 280 with computer system 400. In some embodiments, additional temperature sensors can be attached to, for example, locations in top portion 208 such as proximate to top bushing 215.

The embodiment shown in FIG. 2B includes an infrared temperature measurement camera 290. Infrared temperature measurement camera 290 can be, for example, an infrared thermographic camera such as a Fluke model RSF 300/600 fixed-mounted thermal imaging camera or a FLIR model A310 fixed-mounted thermal imaging camera. Infrared temperature measurement camera 290 can be disposed exterior to the vertical molten sulfur pump assembly. For example, infrared temperature measurement camera 290 can be attached to a wall of sulfur sump 260 with its image capture lens focused on bottom portion 210 and can be configured to measure the temperature of the surface of molten sulfur 262 and/or the exterior of bottom portion 210 within the vapor space above the surface of molten sulfur 262. In some embodiments, camera 290 can also be configured to monitor changes in the skin temperature of discharge passageway 238, which can indicate a loss of flow condition. IR monitoring may also detect other failure modes that have been experienced, such as steam leaks, which can result in condensate and formation of sulfuric acid, which can be a concern in terms of safety and potential corrosion of the pumps and the sump/tank environment. Cable 292 or another suitable wired or wireless connection connects infrared temperature measurement camera 290 with computer system 400. In some embodiments, infrared temperature measurement camera 290 can be part of vertical molten sulfur pump vibration and temperature monitoring system 200 in addition to, or instead of, temperature sensor 280 of FIG. 2A.

Figure 3:
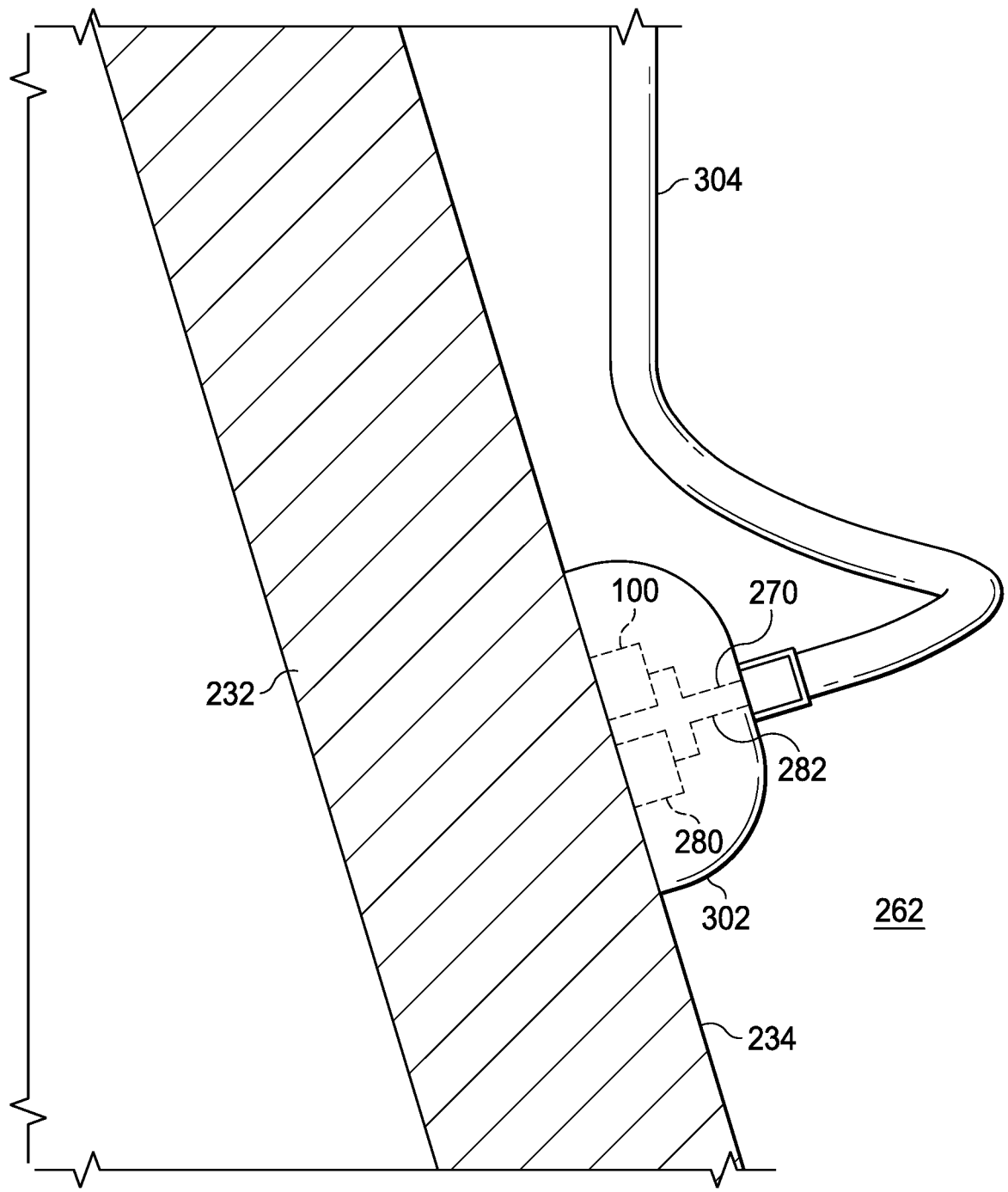
FIG. 3 is a schematic drawing of an example sensor capsule for enclosing the vibration and temperature sensors.

FIG. 3 is a schematic drawing of an example sensor capsule for enclosing the vibration sensor 100 of FIGS. 1A, 2A, and 2B in accordance with an embodiment of the present disclosure. In the illustrated embodiment, the sensor capsule also encloses temperature sensor 280 of FIG. 2A; in other embodiments, the sensor capsule only encloses vibration sensor 100. Referring to FIG. 3, vibration sensor 100 and temperature sensor 280 are attached to an external surface 234 of the bottom portion of the molten sulfur pump assembly, and specifically in the illustrated embodiment, on an external surface of impeller casing 232, as also described in reference to FIGS. 2A and 2B. Sensor capsule 302 comprises a cover attached to external surface 234, defining a capsule interior volume within which vibration sensor 100 and temperature sensor 280 are positioned, thereby isolating vibration sensor 100 and temperature sensor 280 from the molten sulfur 262. In some embodiments, vibration sensor 100 and temperature sensor 280 are enclosed by, but do not touch, sensor capsule 302. Such encapsulation can protect vibration sensor 100 and temperature sensor 280 and reduce the danger from electrical or thermal energy (such as ignition of fluid from heat or sparks), without interfering with the operation of vibration sensor 100 and/or temperatures sensor 280. Sensor capsule 302 is connected to tube 304 which provides a passageway for cables 270 and 282 which are attached to vibration sensor 100 and temperatures sensor 280 and, as shown in FIGS. 2A and 2B, connect vibration sensor 100 and temperature sensor 280 to computer system 400 (not shown in FIG. 3). Sensor capsule 302 and tube 304 can be made of high-temperature thermoplastic rubber or polymer materials, or other suitable flexible, abrasion-resistant materials.

FIG. 4 is a block diagram of the computer system 400 used to provide computational functionalities associated with described algorithms, methods, functions, processes, flows, and procedures, as described in this specification, according to an implementation. As mentioned previously, the vibration sensor 100 can include the computer system 400. The illustrated computer 402 is intended to encompass any computing device such as a server, desktop computer, laptop/notebook computer, one or more processors within these devices, or any other processing device, including physical or virtual instances (or both) of the computing device. Additionally, the computer 402 can include a computer that includes an input device, such as a keypad, keyboard, touch screen, or other device that can accept user information, and an output device that conveys information associated with the operation of the computer 402, including digital data, visual, audio information, or a combination of information.

The computer 402 includes an interface 404. Although illustrated as a single interface 404 in FIG. 4, two or more interfaces 404 may be used according to particular needs, desires, or particular implementations of the computer 402. Although not shown in FIG. 4, the computer 402 can be communicably coupled with a network. The interface 404 is used by the computer 402 for communicating with other systems that are connected to the network in a distributed environment. Generally, the interface 404 comprises logic encoded in software or hardware (or a combination of software and hardware) and is operable to communicate with the network. More specifically, the interface 404 may comprise software supporting one or more communication protocols associated with communications such that the network or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in this specification.

The computer 402 can also include a database 406 that can hold data for the computer 402 or other components (or a combination of both) that can be connected to the network. Although illustrated as a single database 406 in FIG. 4, two or more databases (of the same or combination of types) can be used according to particular needs, desires, or particular implementations of the computer 402 and the described functionality. While database 406 is illustrated as an integral component of the computer 402, database 406 can be external to the computer 402.

The computer 402 also includes a memory 407 that can hold data for the computer 402 or other components (or a combination of both) that can be connected to the network. The memory 407 is a computer-readable storage medium. Although illustrated as a single memory 407 in FIG. 4, two or more memories 407 (of the same or combination of types) can be used according to particular needs, desires, or particular implementations of the computer 402 and the described functionality. While memory 407 is illustrated as an integral component of the computer 402, memory 407 can be external to the computer 402. The memory 407 can be a transitory or non-transitory storage medium.

The memory 407 stores computer-readable instructions executable by the processor 405 that, when executed, cause the processor 405 to perform operations, such as any of the steps of method 300B. The computer 402 can also include a power supply 414. The power supply 414 can include a rechargeable or non-rechargeable battery that can be configured to be either user- or non-user-replaceable. The power supply 414 can be hard-wired. There may be any number of computers 402 associated with, or external to, a computer system containing computer 402, each computer 402 communicating over the network. Further, the term "client," "user," "operator," and other appropriate terminology may be used interchangeably, as appropriate, without departing from this specification. Moreover, this specification contemplates that many users may use one computer 402, or that one user may use multiple computers 402.

Figure 5:
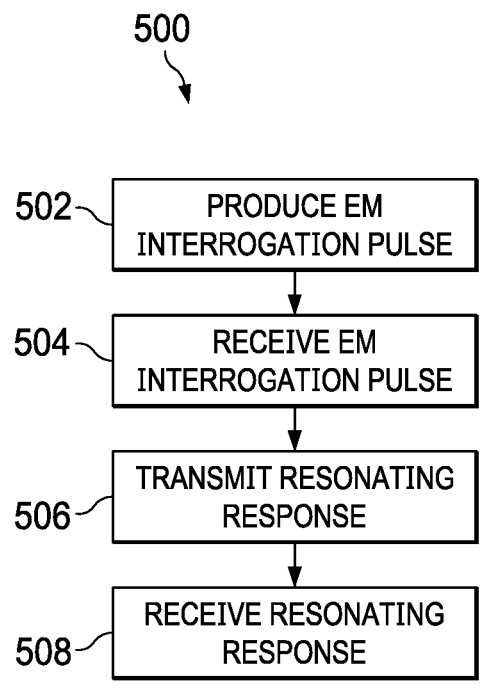
FIG. 5 is a flow chart of an example method for using the vibration sensor of FIG. 1A.

FIG. 5 is a flow chart of a method 500 that can be implemented to sense vibrations in operating equipment, for example, the vertical molten sulfur pump vibration monitoring system 200. For example, method 500 can be implemented by the vibration sensor 100. At step 502, an electromagnetic interrogation pulse having a first frequency is produced by an RF interrogator (such as the RF interrogator 102).

At step 504, the electromagnetic interrogation pulse from the RF interrogator 102 is received by a resonant patch of a responsive layer (such as the resonant layer 104b of the responsive patch 104). The resonant layer 104b resonates at the first frequency in response to receiving the electromagnetic interrogation pulse at step 504.

At step 506, a resonating response of the responsive patch 104 is transmitted by a transmission line (such as the transmission line 108) that couples the responsive layer to an RF resonance detector (such as the RF resonance detector 106). The resonating response of the responsive patch 104 is transmitted by the transmission line 108 to the RF resonance detector 106 at step 506.

At step 508, the resonating response of the responsive patch 104 is received (detected) by the RF resonance detector 106.

Figure 6:
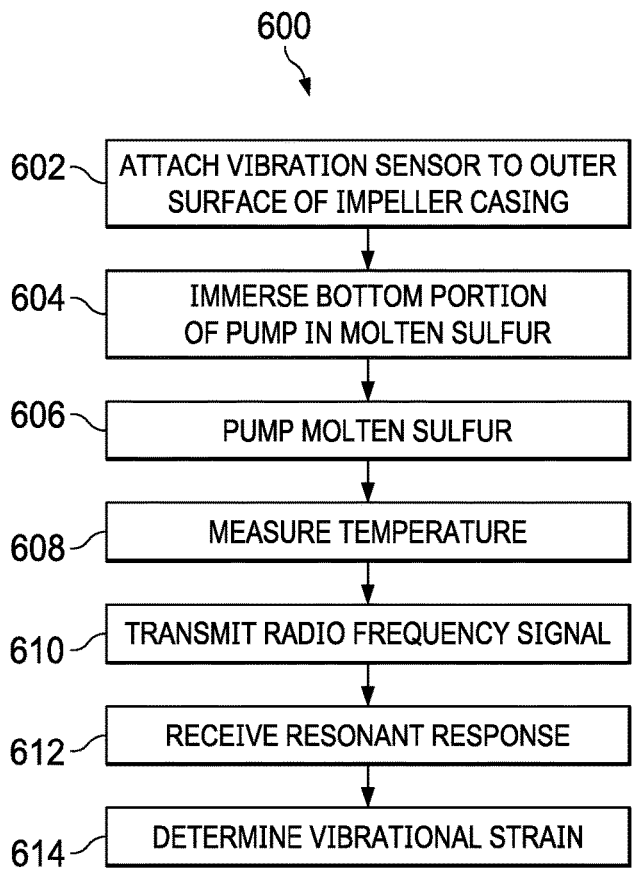
FIG. 6 is a flow chart of an example method that can be implemented by the vertical molten sulfur pump vibration and temperature monitoring system of FIG. 2A or 2B.

FIG. 6 is a flow chart of a method 600 that can be implemented by vertical molten sulfur pump vibration monitoring system 200 of FIG. 2A or 2B and vibration sensor 100 of FIGS. 1A and 1B. For example, vertical molten sulfur pump monitoring system 200 can implement method 600 to dispose vibration sensor 100 and on a pump and process data obtained by the vibration sensor 100. In some implementations, method 500 includes an implementation of method 600. For example, method 500 can include any of the steps of method 600.

Referring to FIG. 6, at step 602 of method 600, vibration sensor 100 is attached on external surface 246 of impeller casing 232 of vertical molten sulfur pump assembly 202. In some embodiments, a temperature sensor (such as temperature sensor 280 of FIG. 2A) is also attached to external surface 246. At step 604, pump inlet 236 and impeller casing 232 are immersed in molten sulfur 262 (together with the other parts of bottom portion 210). At step 606, molten sulfur 262 is pumped into pump inlet 236 and upwards through discharge passageway 238 by rotation of impeller 230.

At step 608, the temperature of the molten sulfur proximate to pump inlet 236 is measured. In some embodiments, such measurement is by temperature sensor 280 as shown in FIG. 2A. In some embodiments such measurement is by infrared temperature measurement system 290 as shown in FIG. 2B.

At step 610, as described in more detail with respect to FIGS. 1A and 1B, a resonating response of the responsive patch 104 is transmitted by a transmission line (such as the transmission line 108) that couples the responsive layer to an RF resonance detector (such as the RF resonance detector 106). The resonating response of the responsive patch 104 is transmitted by the transmission line 108 to the RF resonance detector 106 at step 610.

At step 612, as described in more detail with respect to FIGS. 1A and 1B, the resonating response from the RF resonance detector 106 is received by one or more processors (such as the processor 405). At step 614, as described in more detail with respect to FIGS. 1A and 1B, the resonating response is processed by the processor 405 to determine a vibrational strain of the resonant layer 104*b*.

Figure 7:
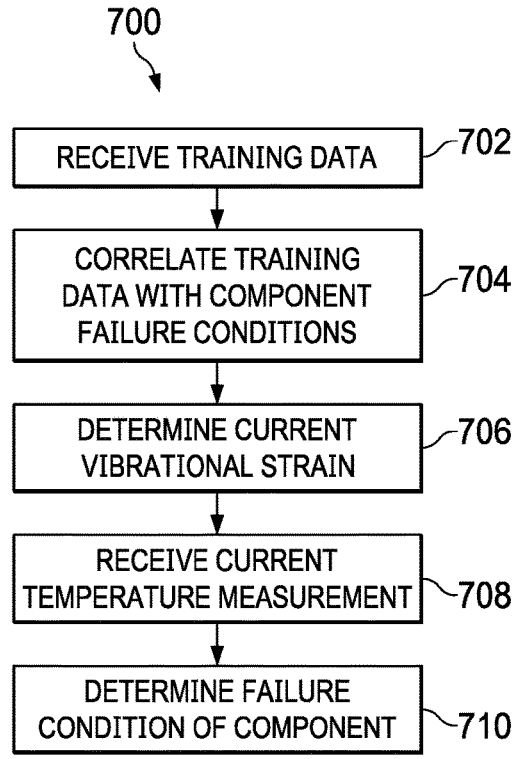
FIG. 7 is a flow chart of an example method that can be implemented by the computer system of FIG. 1B, FIG. 2A, and FIG. 2B.

FIG. 7 is a flow chart of a method 700 that can be implemented by computer system 400. For example, computer system 400 can implement method 700 to determine failure conditions of a component of a vertical molten sulfur pump assembly 202. In some implementations, methods 500 and/or 600 include an implementation of method 700. For example, methods 500 and/or 600 can include any of the steps of method 700.

For method 700, computer system 400 is configured to implement a machine learning model to perform machine learning operations. Suitable machine learning models include neural network (NN), support vector machine, Bayesian network, or hidden Markov or semi-Markov models. Machine learning models can learn from the part of a labeled dataset and conduct the interpolation for the rest of the data points. At step 702, computer system 400 receives training data which includes historical vibrational strain signatures under normal operations and under historical pump component failure conditions of the various components of vertical molten sulfur pump assembly 202. Such failure conditions can include cavitation, rotor imbalance, wear of line shaft bushings, worn bottom bearing/bushing, rubbing conditions, column resonance, broken shaft coupling, dislocation of bushings, broken seals, bearing failure, impeller faults, imbalance loading, and/or component misalignment. In some embodiments, other or additional failure conditions are included. The training data can further comprises historical temperature data comprising historical molten sulfur temperatures proximate to the pump inlet and/or historical temperatures of components of vertical molten sulfur pump assembly 202. Historical vibrational strain signatures, historical temperature data, and/or historical pump failure conditions can comprise a labeled dataset measured from an actual pump under operating (field) conditions and/or data synthesized in a laboratory environment. Noise and sensor problems (such as drift) can be compensated for and/or filtered out.

At step 704, the machine learning operations further comprise interpolating the data points and correlating the historical temperature data and historical vibrational strain signatures with the historical pump component failure conditions.

At step 706, computer system 400 determines the current vibrational strain of vertical molten sulfur pump assembly 202, by, for example, following the steps of method 600 of FIG. 6. At step 708, computer system 400 receives the measured temperature data from temperature sensor 280 and/or infrared temperature measurement camera 290.

At step 710, computer system 400 compares the current vibrational strain with the historical vibrational strain signatures and compares the temperature of the molten sulfur measured by the temperature sensor with the historical temperature data to determine a failure condition of one of the components of vertical molten sulfur pump assembly 202.

In some embodiments, data fed into the machine learning model for anomalous behavior detection can be real data collected from the pump, synthesized controlled data in the lab, and/or historical data. Recurrent neural network (RNN) time series based models using Tensor Flow architecture can be used.

In some embodiments, the machine learning algorithm can be analyze infrared (IR) time series data. IR data provides more information that capture characteristics of heat transfer over time. Pump health indicators, such as excessive vibration and high temperature, could form very unique data patterns pointing out an anomalous behavior. A temperature-vibration effect would result in abnormal spatio-temporal heat transfer signatures in IR time series data. A deep learning algorithm can separate out these abnormal signatures from normal heat transfer/vibration signatures of a pump under monitoring. This can be done by training on many datasets and events. It would be very time-consuming, if not impossible, for humans to manually recognize these subtle abnormal temporal behaviors in a given IR dataset (e.g. by examining each frame one by one). Comparing vibration response to the "baseline" or normal vibration response can provide the severity of the vibration, and the frequency can determine the possible failure mechanism. In some embodiments, vibration amplitudes acquired at both the bottom impeller or inlet location, and the top motor location can be compared to more accurately determine the fault location.

In some embodiments, other variables can be also used for machine learning aspect for troubleshooting, such as pump flow, discharge pressure, motor amperage, etc. For instance, a high frequency broadband vibration response, coupled with reduced flow rate and motor amperage would be a clear indicator of a suction related problem, such as cavitation. A slowly upward trend in ½× running speed frequency, coupled with an increase in overall vibration amplitude including the top motor location, would be an indication of excessive bushing clearance. High temperature at the inlet of the pump, coupled with loss of pump flow, would be an indication of a temperature control issue with the sulfur resulting in a change in sulfur viscosity. The remaining useful life, or RUL, is an estimate of the length of time during which a component or a system is expected to operate as it is intended. In some embodiments, the machine learning model implemented by computer system 400 can estimate the remaining useful life of one of the plurality of components, based on the current vibrational strain, the historical vibrational strain signatures, and an estimated lifespan of the one of the plurality of components. For example, the life data method estimates the RLU based on how long it took similar machines to fail. Another method uses a threshold value as an indicator for detecting failure. The estimation models compute the RUL value with a confidence interval on the prediction In some embodiments, support vector machines (SVM) classification methods can be used to estimate RUL. SVM is a supervised machine learning model that uses binary classifications While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "nanoscale" refers to a scale on the order of 1 micrometer (1000 nanometers) or less. For example, nanoscale includes sizes ranging from 1 nanometer up to 1000 nanometers. The term "nanomaterial" refers to a material with a dimension (for example, a maximum or average dimension) in a range of from 1 nanometer to 1000 nanometers. Further, the term "nanoparticle" refers to a particle with a dimension (for example, a maximum or average dimension) in a range of from 1 nanometer to 1000 nanometers. A dimension can be, for example, diameter, length, width, height, or thickness.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A system comprising:
a vertical molten sulfur pump assembly comprising:
 a top portion adjacent to a first end of the vertical molten sulfur pump assembly and a bottom portion adjacent to a second end of the vertical molten sulfur pump assembly;
 a pump motor disposed in the top portion;
 an impeller disposed in the bottom portion within an impeller casing;
 a shaft disposed within a central column and connecting the pump motor with the impeller; and
 a pump inlet at the second end below the impeller casing, wherein the pump inlet and the impeller casing are configured to be immersed in molten sulfur, and wherein the vertical molten sulfur pump assembly is configured to pump the molten sulfur into the inlet and upwards through a discharge passageway by rotation of the impeller;
a vibration sensor and a temperature sensor disposed on an external surface of the bottom portion, on or proximate to the impeller casing and the pump inlet, wherein the temperature sensor is configured to measure a temperature of the molten sulfur proximate to the pump inlet, and wherein the vibration sensor comprises:
 a substrate comprising a polymer; and
 a resonant layer disposed on a surface of the substrate, the resonant layer comprising an electrically conductive nanomaterial and configured to produce a resonant response in response to receiving a radio frequency signal;
one or more processors; and
a non-transitory computer readable medium storing instructions executable by the one or more processors to perform computer system operations comprising:
 receiving the resonating response;
 processing the resonating response to determine a current vibrational strain of the resonant layer.

2. The system of claim 1, wherein the operations further comprise determining a component failure condition of one of a plurality of components of the vertical molten sulfur pump assembly by comparing a determined operational strain with a plurality of vibrational strain signatures to determine whether the determined vibrational strain matches any of the plurality of vibrational strain signatures, wherein at least one of the plurality of vibrational strain signatures corresponds to the component failure condition.

3. The system of claim 2, wherein the determining the pump failure condition further comprises using temperature data from the temperature sensor.

4. The system of claim 2, wherein the component failure condition corresponds to a failure of a bushing in the bottom portion at a bottom end of the shaft.

5. A system comprising:

a vertical molten sulfur pump assembly comprising:
- a top portion adjacent to a first end of the vertical molten sulfur pump assembly and a bottom portion adjacent to a second end of the vertical molten sulfur pump assembly;
- a pump motor disposed in the top portion;
- an impeller disposed in the bottom portion within an impeller casing;
- a shaft disposed within a central column and connecting the pump motor with the impeller; and
- a pump inlet at the second end below the impeller casing, wherein the pump inlet and the impeller casing are configured to be immersed in molten sulfur, and wherein the vertical molten sulfur pump assembly is configured to pump the molten sulfur into the inlet and upwards through a discharge passageway by rotation of the impeller; and a vibration sensor and a temperature sensor disposed on an external surface of the bottom portion, on or proximate to the impeller casing and the pump inlet, wherein the temperature sensor is configured to measure a temperature of the molten sulfur proximate to the pump inlet, and wherein the vibration sensor comprises:
- a substrate comprising a polymer; and
- a resonant layer disposed on a surface of the substrate, the resonant layer comprising an electrically conductive nanomaterial and configured to produce a resonant response in response to receiving a radio frequency signal;

and further comprising a sensor capsule comprising a cover attached to a portion of the external surface of the bottom portion, thereby defining a capsule interior volume isolated from the molten sulfur, and wherein the vibration sensor is positioned within the capsule interior volume.

6. The system of claim 5, wherein the sensor capsule comprises a polymer material.

* * * * *